United States Patent
Lutterodt et al.

(10) Patent No.: US 8,234,746 B2
(45) Date of Patent: Aug. 7, 2012

(54) WATER BLOCKER FOR WIPER SYSTEM

(75) Inventors: Herbert Lutterodt, Novi, MI (US);
Christopher Wood, Troy, MI (US)

(73) Assignee: Robert Bosch GmbH, Stuttgart (DE)

( * ) Notice: Subject to any disclaimer, the term of this patent is extended or adjusted under 35 U.S.C. 154(b) by 832 days.

(21) Appl. No.: 12/235,085

(22) Filed: Sep. 22, 2008

(65) Prior Publication Data

US 2010/0071147 A1 Mar. 25, 2010

(51) Int. Cl.
*B60S 1/06* (2006.01)
*B60S 1/04* (2006.01)

(52) U.S. Cl. ............... 15/250.3; 15/250.001; 15/250.31; 137/312; 137/354

(58) Field of Classification Search .................. 15/250.3, 15/250.31, 250.27, 250.001; 137/312, 351, 137/354
See application file for complete search history.

(56) References Cited

U.S. PATENT DOCUMENTS

| 2,684,114 | A | * | 7/1954 | Johannesen | 137/561 R |
| 5,836,042 | A | | 11/1998 | Funk et al. | |
| 6,410,849 | B1 | | 6/2002 | Okabe et al. | |
| 6,718,593 | B2 | * | 4/2004 | Shido | 15/250.31 |
| 2002/0069474 | A1 | * | 6/2002 | Burkard et al. | 15/250.3 |
| 2003/0077013 | A1 | * | 4/2003 | Zimmer | 384/415 |
| 2004/0034959 | A1 | * | 2/2004 | Nakamura | 15/250.31 |
| 2005/0097700 | A1 | * | 5/2005 | Iwata | 15/250.3 |

FOREIGN PATENT DOCUMENTS

| JP | 2006264452 A | 5/2006 |
| JP | 2006231946 A | 7/2006 |

* cited by examiner

*Primary Examiner* — Gary Graham
(74) *Attorney, Agent, or Firm* — Michael Best & Friedrich LLP

(57) ABSTRACT

A wiper system for a vehicle includes a frame supported by the vehicle and a wiper motor supported by the frame. The wiper system further includes a wiper arm coupled to the wiper motor and configured to be driven by the wiper motor to move in a reciprocating pattern. A water blocking member is wrapped around a portion of the frame to prevent water running along the frame from reaching the wiper motor. The blocking member is flexible and has separate free ends to enable assembly with the frame. A method of assembling the wiper system includes pressing the water blocker onto the frame at a location away from spaced apart ends of the frame.

14 Claims, 3 Drawing Sheets

WATER BLOCKER FOR WIPER SYSTEM

BACKGROUND

The present invention relates to automotive windshield wiper systems. A windshield wiper motor is generally protected from rain water and runoff from the windshield of an automobile. However, in some circumstances, the protection for the wiper motor may become compromised. Windshield wiper motors, which are typically electric motors, may fail if even a small amount of liquid water is introduced into the motor casing. Thus, some windshield wiper motors are waterproofed with upgraded seals, gaskets, etc. to prevent untimely failure due to moisture at the expense of increased cost and complexity. Solutions for preventing water in the area of the wiper motor from physically contacting the wiper motor generally include caps or covers specifically molded to fit onto the wiper motor to cover the top of the wiper motor. Such covers are made specific to a given arrangement of components in a wiper system (e.g., one size and type of wiper motor mounted in a particular manner) and care must be taken to avoid interference between the cover and the moving components of the wiper system.

SUMMARY

In one embodiment, the invention provides a wiper system for a vehicle. The wiper system includes a frame supported by the vehicle and a wiper motor supported by the frame. The wiper system further includes a wiper arm coupled to the wiper motor and configured to be driven by the wiper motor move in a reciprocating pattern. A blocking member is wrapped around a portion of the frame to prevent water running along the frame from reaching the wiper motor. The blocking member is flexible and has separate free ends to enable assembly with the frame.

In one embodiment, the frame includes a beam having a generally cylindrical outer surface and spaced-apart ends and the wiper motor is supported by the frame at an intermediate position along the beam. The blocking member is wrapped around a portion of the beam between a first of the spaced-apart ends and the wiper motor to prevent water running along the beam from reaching the wiper motor. The blocking member is wrapped in a generally helical pattern at least 360 degrees around the beam.

In another embodiment, the invention provides a method of assembling a vehicle wiper system including a water blocker. A wiper motor is provided, and a frame for the wiper system is also provided, the frame having spaced ends. The frame is mounted on the vehicle at the spaced ends of the frame. The wiper motor is coupled to the frame. A wiper arm is provided, the wiper arm being coupled to the wiper motor and configured to be driven by the wiper motor to move in a reciprocating pattern. A resilient water blocker is provided, the water blocker being adapted to be coupled to the frame and to deflect water from running along the frame and reaching the wiper motor. The water blocker is pressed onto the frame at a location away from the ends.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

DETAILED DESCRIPTION

Figure 1:
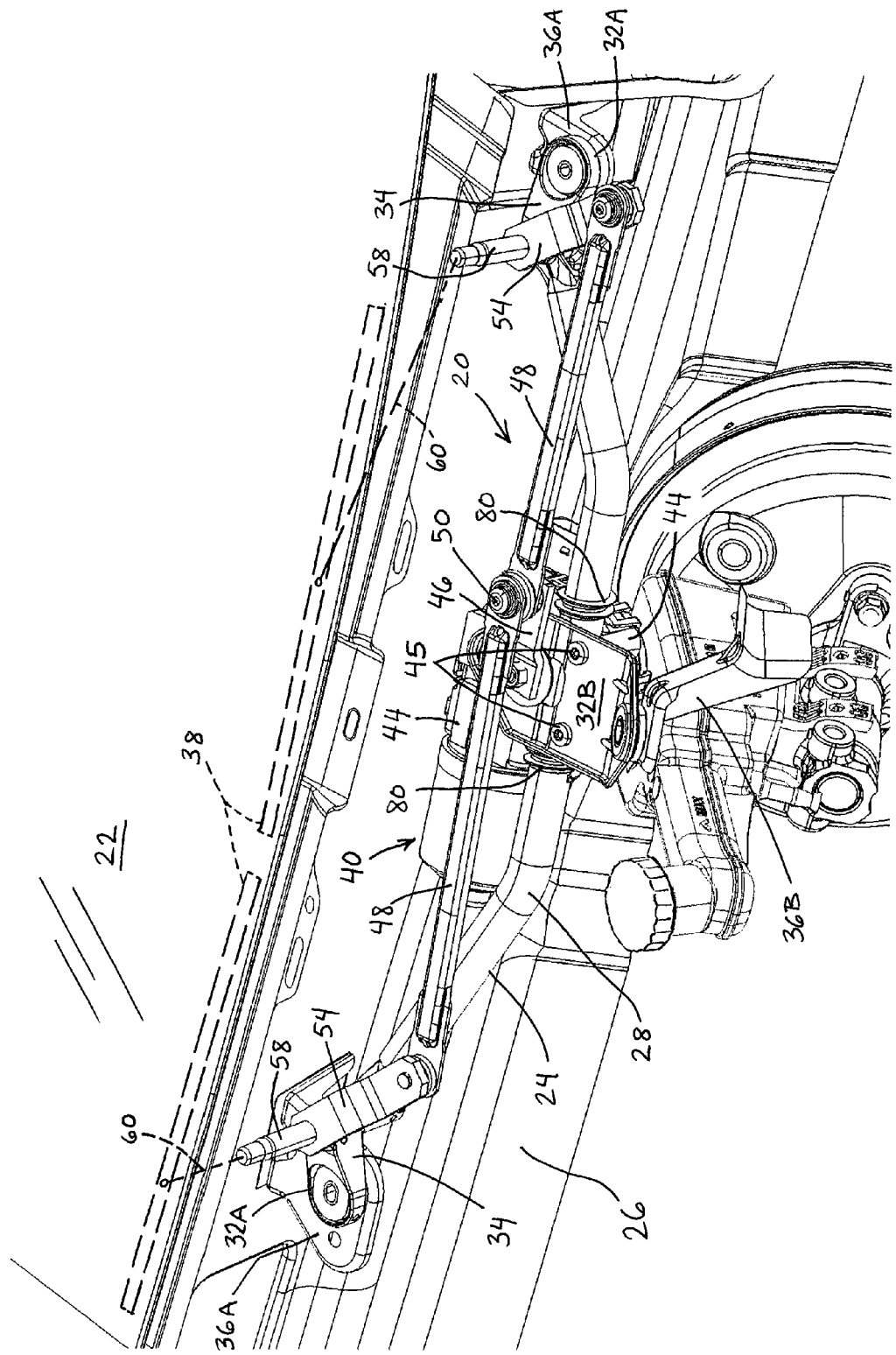
FIG. 1 is a perspective view of a wiper system mounted in a vehicle and including water blockers according to the invention.

FIG. 1 illustrates a windshield wiper system 20 for a windshield 22 of a vehicle, such as a passenger car, truck, etc. The wiper system 20 includes a frame 24 that is coupled to and supported by a body/frame structure 26 of the vehicle. The frame 24 of the wiper system 20 includes a main beam 28 and a plurality of mounting flanges 32. In the illustrated embodiment, the main beam 28 is generally circular in cross section, and the frame 24 includes mounting flanges 32A with integrated pivot housings 34 at each end of the main beam 28 and an additional mounting flange 32B positioned substantially at an intermediate or central portion of the main beam 28. The outer or "peripheral" mounting flanges 32A are permanently attached to the respective ends of the main beam 28 (by crimping, welding, integral casting, etc.) and define respective ends of the frame 24. The peripheral mounting flanges 32A are supported by respective brackets or supports 36A extending from the body/frame structure 26 of the vehicle. Each one of the pivot housings 34 rotatably mounts a wiper blade 38 to the frame 24 as discussed in further detail below, so that the wiper blades 38 (shown in phantom in FIG. 1) are movable across the windshield 22 to clear off water and/or debris.

Figure 2:
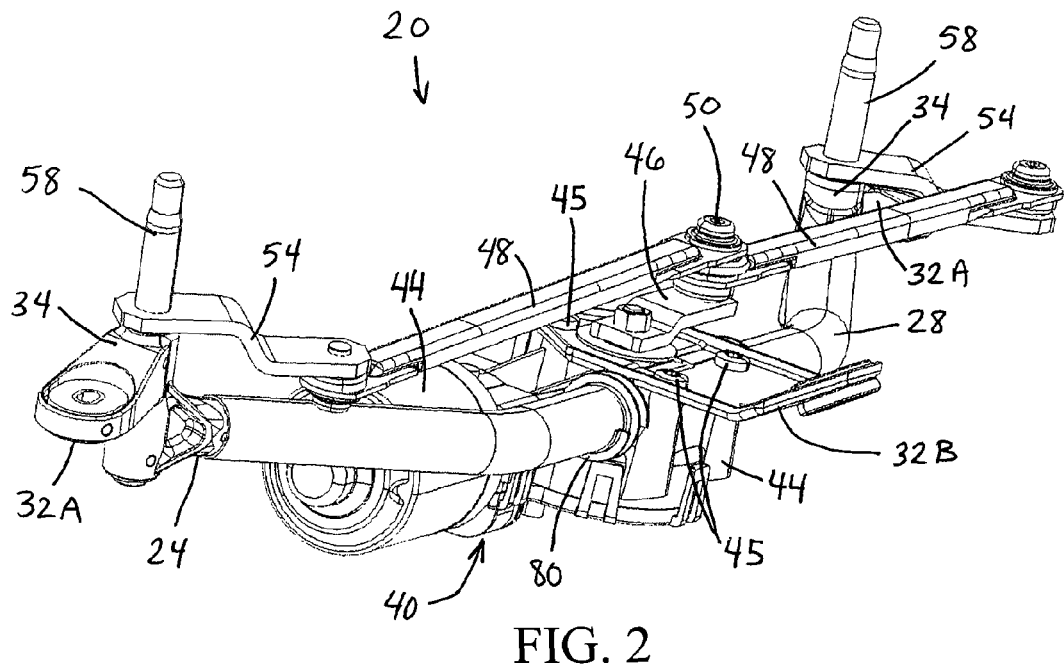
FIG. 2 is an alternate perspective view of the wiper system including the water blockers of FIG. 1.
Figure 4:
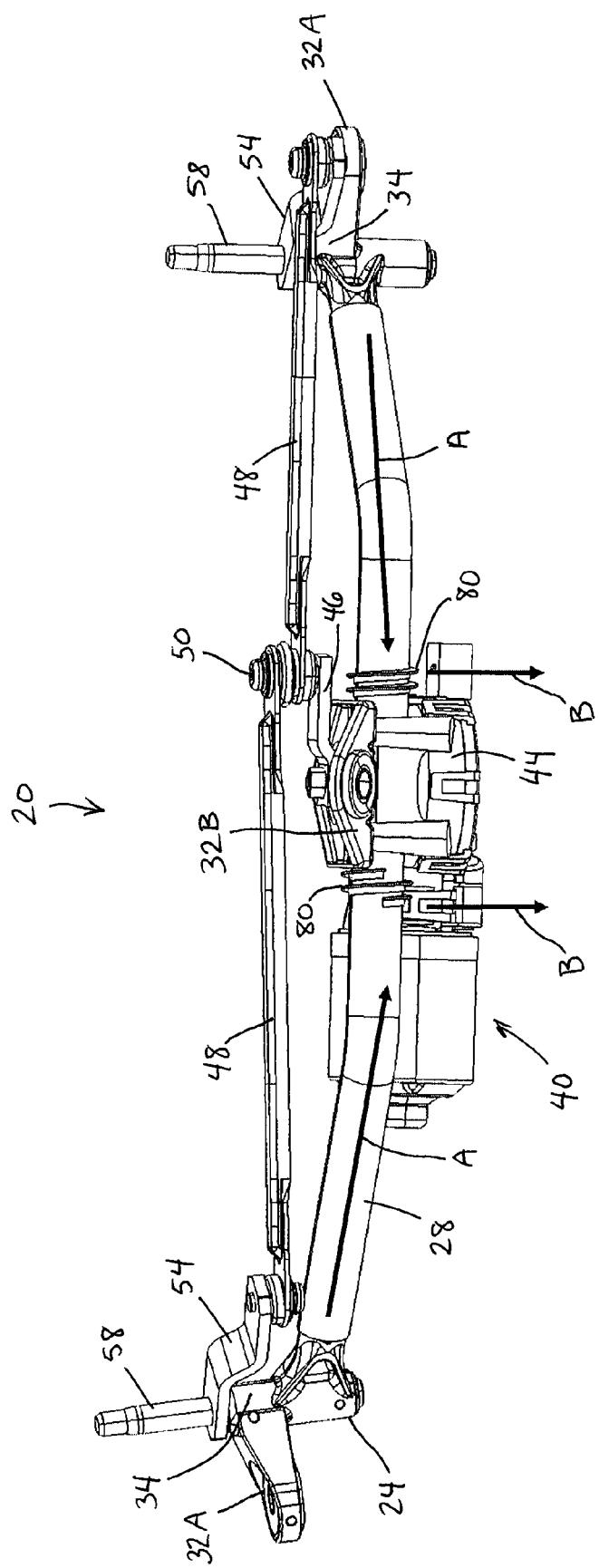
FIG. 4 is an orthogonal view of the wiper system of FIGS. 1 and 2.

The intermediate mounting flange 32B is supported by a bracket or support 36B extending from the body/frame structure 26 of the vehicle. A wiper motor 40 is supported substantially at the middle portion of the main beam 28, intermediate the ends of the frame 24. The wiper motor 40 includes a housing or casing 44 that encloses internal components of the wiper motor 40. In the illustrated construction as shown in FIGS. 2 and 4, the casing 44 at least partially receives the central portion of the main beam 28 and engages the beam 28 such that the position of the wiper motor 40 along the frame 24 and along the main beam 28 is substantially fixed. Furthermore, the main beam 28 is substantially clamped between the casing 44 and the intermediate mounting flange 32B. Fasteners 45 (FIGS. 1 and 2) extend through the intermediate mounting flange 32B and into the casing 44. Therefore, the wiper motor 40 engages or is directly coupled to both the main beam 28 and the intermediate mounting flange 32B of the frame 24. Other arrangements for supporting the wiper motor 40 at least in part by the main beam 28 are optional, some of which may not include a clamp-type arrangement and some of which may not require a mounting flange of the frame 24.

The wiper motor 40 can be an electric motor, such as a direct current (DC) electric wiper motor. The wiper motor 40 is connected to a control, typically inside the vehicle, for starting/stopping the wiper motor 40 and adjusting the speed and/or frequency of operation. The wiper motor casing 44 encloses the internal components of the wiper motor 40, including for example, electrically conductive and/or rotating components, intermeshing gears, permanent magnets, etc.

The wiper motor 40 rotatably drives a crank 46 that is coupled to a pair of primary links 48 at a single pivot joint 50. The crank 46 rotates about a first axis. Each primary link 48 is pivotably coupled to a secondary link 54 such that substantially reciprocating-type movement of the primary links 48 drive the secondary links 54 to rotate about respective second axes. The secondary links 54 are mounted rotatably within the pivot housings 34 to rotate about the second axes. Each of the secondary links 54 includes a rod or pin 58 that extends substantially upward and outward from the respective pivot housing 34. The wiper blades 38 are coupled to the pins 58 by respective wiper arms 60 (shown schematically in FIG. 1) so that the wiper arms 60 and wiper blades 38 are swept across the windshield 22, pivoted at the pivot housings 34, when the wiper motor 40 is operated.

It is common to conceal the wiper system 20 (except for the wiper arms 60 and the wiper blades 38) substantially underneath a hood and/or cowl screen of the vehicle. The cowl screen may be positioned substantially between the hood and the windshield 22 when the hood is closed. Commonly, the cowl screen is coupled to the base of the windshield 22 and may be positioned directly vertically above a portion of the wiper system 20 (the "concealed portion", including the wiper motor 40) to prevent water, such as rain water, from running directly off the windshield 22 onto the concealed wiper system 20 components. Commonly, there is also a seal defined between the base of the windshield 22 and the cowl screen so that water does not leak between the windshield 22 and the cowl screen. However, certain circumstances may arise that allow water to penetrate at least one of the cowl screen (which is typically slotted or perforated for ventilation) and the seal between the windshield 22 and the cowl screen, thus introducing water to the concealed portion of the wiper system 20. Water incident upon the main beam 28 and most any other portion of the frame 24 will run down or along the main beam 28 toward the wiper motor 40.

The wiper motor 40 may or may not be particularly configured for operation or extended use when wet. Regardless of the actual or perceived capability of the casing 44 to keep water from penetrating into the wiper motor 40, it is advantageous to prevent water from reaching the wiper motor 40 altogether. To obviate this potential problem, one or more members 80 (FIG. 3), such as spring collars, are provided on the frame 24 as shown in FIGS. 1, 2, and 4 for blocking or shielding the wiper motor 40 from water.

As best illustrated in FIGS. 1 and 4, two water blockers 80 are positioned on the frame 24, one on each side of the wiper motor 40. Depending on the particular configuration and/or orientation of a given wiper system frame and its surroundings, a single water blocker 80 may be adequate or more than two water blockers 80 could be used. In the illustrated embodiment, the water blockers 80 wrap around the main beam 28 adjacent the location of engagement between the wiper motor 40 and the main beam 28. Therefore, water that may come into contact with the main beam 28 and run along the main beam 28 (as shown by arrows A in FIG. 4) by gravity or other means toward the wiper motor 40 is blocked from reaching the wiper motor 40 and is directed off of the main beam 28 (as shown by arrows B in FIG. 4). By positioning the water blockers 80 in close proximity to the wiper motor 40, the risk of water dripping or running onto the shielded portion of the main beam 28 (the portion extending between the water blockers 80) is greatly reduced or eliminated. In some embodiments, the water blockers 80 are not more than about 70 millimeters apart.

Figure 3:
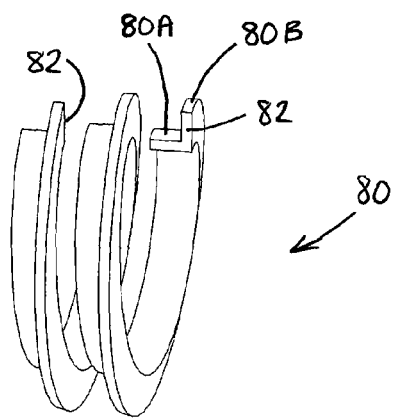
FIG. 3 is a perspective view of one of the water blockers of FIGS. 1 and 2.

As shown in the drawings, each water blocker 80 has a generally helical form with two separated free ends 82 and extends at least a full 360 degrees around the outer surface of the main beam 28. In the illustrated embodiment, each water blocker 80 wraps about 720 degrees (or substantially two full turns) around the main beam 28. Having each water blocker 80 wrap more than one full turn around the main beam 28 makes it unlikely or impossible for water coming into contact with the water blocker 80 to travel along the water blocker 80 from one side (the "wet" side) to the other (the "dry" side). In some constructions and as best shown in FIG. 3, the water blockers 80 are formed with an L-shaped cross-section. Therefore, each water blocker 80 includes a first portion 80A that lies flush against the main beam 28 and a second portion 80B that extends generally perpendicular from the first portion 80A and outwardly away from the main beam 28. The water blockers 80 have a shape and an overall radial dimension sufficiently larger than the main beam 28 such that water cannot traverse the water blocker 80 to get from the wet side to the dry side. Rather, water that encounters either of the water blockers 80 is directed away from and off of the frame 24 of the wiper system 20. Other cross-sectional shapes besides an L-shaped cross-section are optional as long as the size and shape of the cross-section is sufficient to force water running along the main beam 28 to fall off of the wiper system 20.

The water blockers 80 are constructed from a substantially flexible and resilient material, such as a resilient variety of plastic, rubber, or steel. Because the water blockers 80 are formed in a helical shape having two opposed and free ends 82, the water blockers 80 are able to be assembled onto the main beam 28 in the exact location desired, without disassembling any of the frame 24 or sliding the water blockers 80 along the main beam 28. The water blockers 80 are flexed to uncoil slightly and are pressed onto the main beam 28 of the frame 24. The water blockers 80 are then wrapped fully around the outer surface of the main beam 28 so that the complementary inner surface of each water blocker 80 seats tightly around the main beam 28. The water blockers 80 may be flexed and/or uncoiled prior to being pressed into contact with the main beam 28, or alternately, the act of pressing the water blockers 80 into contact with the main beam 28 may cause the flexing necessary to get the water blockers 80 around the main beam 28.

The water blockers 80 can be attached at an intermediate or central location of the frame 24 that is adjacent the wiper motor 40 and generally away from the ends that mount to the peripheral vehicle supports 36A because the open helical configuration allows attachment without access to a free end. This enables one or more water blockers 80 to be retrofitted to the wiper system 20 where not provided as original equipment. Furthermore, identical water blockers 80 may be produced in mass quantities and used with various wiper systems having different arrangements (size and shape of parts, linkage arrangements, etc.) as long as the given wiper system uses a beam, at least a portion of which has an outer surface similar in size and shape to the illustrated main beam 28. It should also be noted that the water blockers 80 need not be circular and can be configured to correspond to a beam of virtually any cross-sectional shape including, but not limited to, triangular, rectangular, square, elliptical, hexagonal, etc.

The illustrated water blockers 80, with the helical shape and spaced apart ends 82, unlike a simple split ring do not require access to a free end of the main beam 28. If the mounting flanges 32A and pivot housings 34 are formed integrally with the main beam 28 (e.g., by casting), access to a "free" end of the main beam 28 does not exist. In other circumstances, access to a free end of the main beam 28 may be limited to the time of initial manufacturing, or may require significant time and/or difficulty to disassemble the frame 24 of the wiper system 20. Because the water blockers 80 extend through an angle greater than 360 degrees, there is no leak-prone "weak spot" necessitating a concentrated effort and mechanism for orienting and maintaining such a weak spot on the upper side of the main beam 28 to ensure its effectiveness in an environment where water runs along the main beam 28 under gravitational force.

Various features and advantages of the invention are set forth in the following claims.

What is claimed is:

1. A wiper system for a vehicle, the wiper system comprising:
    a frame supported by the vehicle;
    a wiper motor supported by the frame;
    a wiper arm coupled to the wiper motor and configured to be driven by the wiper motor to move in a reciprocating pattern; and
    a blocking member wrapped around a portion of the frame to prevent water running along the frame from reaching the wiper motor, the blocking member being flexible and having separate free ends to enable assembly with the frame, wherein the blocking member wraps at least 360 degrees around the frame,
    wherein the blocking member wraps around the frame in a helical pattern.

2. The wiper system of claim 1, wherein the blocking member has a substantially L-shaped cross-section including a first portion lying flat against the frame and a second portion extending outwardly away from the frame to direct water off of the frame.

3. The wiper system of claim 1, wherein the frame includes a beam having a pair of spaced apart ends, each end defining a mounting portion that is fixed to the vehicle, and wherein the wiper motor is supported by the beam.

4. The wiper system of claim 3, wherein the wiper motor is supported at a generally intermediate position along the beam, the blocking member being wrapped around the beam on a first side of the wiper motor and a second blocking member being wrapped around the beam on a second side of the wiper motor opposite the first side.

5. The wiper system of claim 1, wherein the portion of the frame upon which the blocking member is wrapped has a generally cylindrical outer surface, and the blocking member has a complementary inner surface to receive the generally cylindrical outer surface.

6. The wiper system of claim 1, wherein the blocking member is plastic.

7. A wiper system for a vehicle, the wiper system comprising:
    a frame supported by the vehicle;
    a wiper motor supported by the frame;
    a wiper arm coupled to the wiper motor and configured to be driven by the wiper motor to move in a reciprocating pattern; and
    a blocking member wrapped around a portion of the frame to prevent water running along the frame from reaching the wiper motor, the blocking member being flexible and having separate free ends to enable assembly with the frame, wherein the blocking member wraps at least 360 degrees around the frame,
    wherein the blocking member wraps about 720 degrees around the frame.

8. A wiper system for a vehicle, the wiper system comprising:
    a frame supported by the vehicle, the frame including a beam having a generally cylindrical outer surface and spaced-apart ends;
    a wiper motor supported by the frame at an intermediate position along the beam;
    a wiper arm coupled to the wiper motor and configured to be driven by the wiper motor to move in a reciprocating pattern; and
    a resilient blocking member wrapped around a portion of the beam between a first of the spaced-apart ends and the wiper motor to prevent water running along the beam from reaching the wiper motor, the blocking member having separate free ends to enable assembly with the beam, the blocking member being wrapped in a generally helical pattern at least 360 degrees around the beam.

9. The wiper system of claim 8, further comprising a second resilient blocking member wrapped around a portion of the beam between a second of the spaced-apart ends and the wiper motor, the second blocking member being substantially identical to the first blocking member.

10. The wiper system of claim 9, wherein the first and second resilient blocking members are spaced apart not more than about 70 millimeters.

11. The wiper system of claim 8, wherein the blocking member is wrapped about 720 degrees around the beam.

12. The wiper system of claim 8, wherein the blocking member has a substantially L-shaped cross-section including a first portion lying flat against the beam and a second portion extending outwardly away from the beam to direct water off of the beam.

13. A wiper system for a vehicle, the wiper system comprising:
    a frame supported by the vehicle;
    a wiper motor supported by the frame;
    a wiper arm coupled to the wiper motor and configured to be driven by the wiper motor to move in a reciprocating pattern; and
    a blocking member wrapped around a portion of the frame to prevent water running along the frame from reaching the wiper motor, the blocking member being flexible and having separate free ends to enable assembly with the frame, wherein the blocking member wraps at least 360 degrees around the frame,
    wherein the blocking member wraps greater than 360 degrees around the frame.

14. A wiper system for a vehicle, the wiper system comprising:
    a frame supported by the vehicle;
    a wiper motor supported by the frame;
    a wiper arm coupled to the wiper motor and configured to be driven by the wiper motor to move in a reciprocating pattern; and
    a blocking member wrapped around a portion of the frame to prevent water running along the frame from reaching the wiper motor, the blocking member being flexible and having separate free ends to enable assembly with the frame, wherein the blocking member wraps at least 360 degrees around the frame,
    wherein the separate free ends of the blocking member are located at separate positions along the frame.

* * * * *